US006301415B1

(12) United States Patent
Zahora et al.

(10) Patent No.: US 6,301,415 B1
(45) Date of Patent: Oct. 9, 2001

(54) OPTICAL GLASS FIBER RIBBON ASSEMBLIES, MATRIX FORMING COMPOSITIONS RADIATION-CURABLE COMPOSITIONS

(75) Inventors: Edward P. Zahora, Naperville; Edward J. Murphy, Arlington Heights; David M. Szum, Elmhurst, all of IL (US)

(73) Assignee: DSM N.V, Heerlen (NL)

(*) Notice: Subject to any disclaimer, the term of this patent is extended or adjusted under 35 U.S.C. 154(b) by 0 days.

(21) Appl. No.: 09/129,233

(22) Filed: Aug. 5, 1998

Related U.S. Application Data

(60) Provisional application No. 60/055,607, filed on Aug. 14, 1997.

(51) Int. Cl.$^7$ ............................... G02B 6/04; G02B 6/44; G02B 6/16; G02B 1/12; C09D 11/02
(52) U.S. Cl. ........................ 385/114; 385/123; 523/160; 428/378
(58) Field of Search ..................................... 523/160, 161; 106/31.05, 31.4, 31.72; 522/75, 78, 81, 83; 385/123, 128, 114; 514/78; 428/392, 378, 375

(56) References Cited

U.S. PATENT DOCUMENTS

| | | | |
|---|---|---|---|
| 4,152,485 | * 5/1979 | Mizumura et al. | 428/423.7 |
| 4,439,344 | * 3/1984 | Albanese | 516/13 |
| 4,500,442 | * 2/1985 | Meyer | 106/38.24 |
| 4,560,616 | 12/1985 | Okita . | |
| 4,624,994 | 11/1986 | Ansel . | |
| 4,629,285 | 12/1986 | Carter . | |
| 4,682,851 | 7/1987 | Ansel . | |
| 4,782,129 | 11/1988 | Moschovis . | |
| 4,794,133 | 12/1988 | Moschovis . | |
| 4,806,574 | 2/1989 | Krajewski . | |
| 4,844,604 | 7/1989 | Bishop . | |
| 4,849,462 | 7/1989 | Bishop . | |
| 4,900,126 | 2/1990 | Jackson . | |
| 4,906,067 | 3/1990 | Mayr . | |
| 4,953,945 | 9/1990 | Nishimura . | |
| 5,011,260 | 4/1991 | Marx . | |
| 5,152,928 | * 10/1992 | Kudo et al. | 516/13 |
| 5,219,896 | 6/1993 | Coady . | |
| 5,259,060 | 11/1993 | Edward . | |
| 5,336,563 | 8/1994 | Coady . | |
| 5,373,578 | 12/1994 | Parker . | |
| 5,377,292 | 12/1994 | Bartling . | |
| 5,496,509 | * 3/1996 | Yamamoto et al. | 264/129 |
| 5,524,164 | 6/1996 | Hattori . | |
| 5,539,849 | 7/1996 | Petisce . | |
| 5,561,730 | 10/1996 | Lochkovic . | |
| 5,621,838 | 4/1997 | Nomura . | |
| 5,881,194 | * 3/1999 | Duecker | 385/115 |
| 5,977,202 | * 11/1999 | Chawla et al. | 522/172 |
| 6,040,357 | * 3/2000 | Murphy et al. | 523/160 |
| 6,085,010 | * 7/2000 | Zahora et al. | 385/114 |

FOREIGN PATENT DOCUMENTS

| | | |
|---|---|---|
| 4007 519 A | 3/1990 | (DE) . |
| 0194 891 A1 | 9/1986 | (EP) . |
| 0 262 340 A2 | 4/1988 | (EP) . |
| 0 345 968 A2 | 12/1989 | (EP) . |
| 0 407 004 A2 | 1/1991 | (EP) . |
| 0 527 266 A1 | 2/1993 | (EP) . |
| 0 614 099 A2 | 9/1994 | (EP) . |
| 0 699 933 A2 | 3/1996 | (EP) . |
| 0 753 777 A2 | 1/1997 | (EP) . |
| 0 780 712 A2 | 6/1997 | (EP) . |
| 2 672 699 A1 | 8/1992 | (FR) . |
| 2 259 704 A1 | 3/1993 | (GB) . |
| 62 177159 | 1/1989 | (JP) . |
| 62-311609 | 6/1989 | (JP) . |
| 4057 814 A | 6/1990 | (JP) . |
| H3-35210 | 2/1991 | (JP) . |
| 3067 208 A | 6/1991 | (JP) . |
| 6-192609 | * 7/1994 | (JP) . |
| WO90/13579 A1 | 11/1990 | (WO) . |
| WO97/05515 A1 | 2/1997 | (WO) . |
| WO97/16469 A1 | 5/1997 | (WO) . |
| WO97/18493 A1 | 5/1997 | (WO) . |
| WO97/19029 A1 | 5/1997 | (WO) . |

OTHER PUBLICATIONS

K.W. Jackson, et al., "The Effect of Fiber Ribbon Component Materials on Mechanical and Environmental Performance", 28 International Wire & Symposium Proceedings (1993).

H.C. Chandon, et al., "Fiber Protective Design for Evolving Telecommunication Applications", International Wire & Symposium Proceedings (1992).

J.R. Toler, et al., "Factors Affecting Mechanical Stripping of Polymer Coatings From Optical Fibers", International Wire & Cable Symposium Proceedings (1989).

W. Griffioen, "Strippability of Optical Fibers", EFOC & N, Eleventh Annual Conference, Hague (1993).

Lewis, Richard, Sr.; Hawley's Condensed Chemical Dictionary 13th Ed., John Wiley and Sons, New York (p. 873), 1997.*

English Translation of JP 6–192609, Jul. 1994.*

* cited by examiner

Primary Examiner—Vasu Jagannathan
Assistant Examiner—Callie E. Shosho
(74) Attorney, Agent, or Firm—Jeffrey S. Melcher; Manelli Denison & Selter, PLLC

(57) ABSTRACT

Provided is a ribbon assembly containing a plurality of coated optical glass fibers and a matrix material which binds the plurality of coated optical glass fibers together. At least one of the coated optical glass fibers contains an ink coating or colored outer primary coating. At least one of the ink coating, the colored outer primary coating, or the matrix material contains a phospholipid.

11 Claims, No Drawings

OPTICAL GLASS FIBER RIBBON ASSEMBLIES, MATRIX FORMING COMPOSITIONS RADIATION-CURABLE COMPOSITIONS

This application claims priority to U.S. Provisional Patent Application 60/055,607 filed on Aug. 14, 1997, the complete disclosure of which is incorporated herein by reference.

FIELD OF THE INVENTION

The invention relates to optical glass fiber ribbon assemblies. The invention also relates to radiation-curable compositions. The radiation-curable compositions are suitable for formulating radiation-curable ink coating compositions, radiation-curable colored outer primary coating compositions, and radiation-curable matrix forming compositions.

BACKGROUND OF THE INVENTION

Optical glass fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

For the purpose of multi-channel transmission, optical glass fiber assemblies containing a plurality of coated optical fibers have been used. Examples of optical glass fiber assemblies include ribbon assemblies and cables. A typical ribbon assembly is made by bonding together a plurality of parallel oriented, individually coated optical glass fibers with a matrix material. The matrix material has the function of holding the individual optical glass fibers in alignment and protecting the same during handling and the installation environment. Often, the fibers are arranged in "tape-like" ribbon structures, having a generally flat, strand like structure containing generally from about 2 to 24 fibers. Depending upon the application, a plurality of resulting ribbon assemblies can be combined into a cable which has from several up to about one thousand individually coated optical glass fibers. An example of a ribbon assembly is described in published European patent application No. 194891. In general, a plurality of ribbon assemblies may then be combined together in a cable, as disclosed in U.S. Pat. No. 4,906,067.

The term "ribbon assembly" as used herein includes the tape-like ribbon assembly described above, as well as optical glass fiber bundles. Optical glass fiber bundles can be, for example, a substantially circular array having at least one central fiber surrounded by a plurality of further optical glass fibers. Alternatively, the bundle may have other appropriate cross-sectional shapes such as square, trapezoid, etc.

Coated optical glass fibers for use in optical glass fiber assemblies are usually coated with an outer colored layer, called an ink coating, or alternatively a colorant is added to the outer primary coating to facilitate identification of the individual coated optical glass fibers. Thus, the matrix material which binds the coated optical glass fibers together contacts the outer ink layer if present, or the colored outer primary coating.

Ink coatings usually have a thickness of about 3 to about 10 microns and are formed from a pigment dispersed within a UV curable carrier system. The UV curable carrier system contains a UV curable oligomer or monomer that is liquid before curing to facilitate application of the ink composition to the optical glass fiber, and then a solid after being exposed to UV radiation. In this manner, the UV curable ink composition can be applied to a coated optical glass fiber in the same manner as the inner primary and outer primary coatings are applied.

It is commonly required that, in use, branching fiber connections must be made at a location intermediate to the respective termini of a given length of the ribbon assembly. Accessing the individual fibers in this manner is commonly referred to as "mid-span access" and presents special problems. Normal methods and tools for accessing the end or terminus of the ribbon assembly are generally not well adapted or are inoperable for providing midspan access.

There have been many attempts to provide a ribbon unit in which the matrix material is easily separated from the colored coating present on optical glass fibers at any location on the ribbon unit without removal of the colored coating from the coated optical glass fibers. However, if the separation of the matrix material also removes the colored coating from the fibers, the purpose of individual fiber identification will be negated.

One common method for providing mid-span access is to contact the matrix material with a solvent, such as ethanol or isopropyl alcohol. Such a solvent must have the ability of swelling or softening the matrix material. At the same time, the solvent should be selected so as not to swell the coatings on the individual optical glass fibers. The swelling of the matrix material weakens that matrix material so that it can then be mechanically removed by mild scrubbing or similar mechanical means to remove the matrix material and thereby provide access to the individual, but still coated and color-identifiable, optical glass fibers. An example of this solvent stripping method is described in the AT&T brochure "D-182355 Accuribbon™ Single Fiber Access" (Mar. 3, 1991).

Published European application number 0614099A2 discloses an optical fiber ribbon unit in which the bonding between the coloring layer of the individual optical glass fibers and the matrix layer is suppressed by adding 5% by weight or less of a release agent to each of the layers. The purpose of adding the release agent is to prevent the coloring layer from being peeled off when the matrix material is separated from the optical glass fibers. Examples of such release agents include a silicone release agent or a fluorine-base release layer.

Published Japanese Patent Application No. 64-22976 discloses radiation-curable ink compositions containing specific radiation-curable oligomers. The ink composition provides an ink coating having adhesion to the outer primary coating which is separable from the matrix material in a ribbon assembly.

Published Japanese Patent Application No. H1-152405 discloses a radiation-curable ink composition containing an organic polysiloxane compound. The polysiloxane compound provides the ink coating with the ability to separate more easily from the matrix material in a ribbon assembly.

U.S. Pat. No. 4,900,126 (Jackson) discloses an optical glass fiber ribbon unit in which each of the individually coated optical glass fibers has a colored outer layer. Each of the optical glass fibers is further coated with a release agent which has a low affinity for the bonding material or the colorant material. An example of the release agent is teflon. The release agent creates a weak boundary layer at the interface of the colorant material and the matrix material whereby the matrix can be separated from the optical glass fibers without removing the colored layer on the individual optical glass fibers.

U.S. Pat. No. 4,953,945 discloses using a peelable cured coating layer between an outer colored layer of optical glass fibers and the matrix material whereby the matrix material can be stripped from the optical glass fibers without removing the colored layer of the optical glass fibers.

U.S. Pat. No. 5,524,164 discloses a cable assembly comprising a plurality of ribbon assemblies. The common coating material that bind the ribbon assemblies together contains a component having poor compatibility with the main component in the common coating. Examples of such poor compatibility components include hydrocarbons having from 10 to 20 carbon atoms, silicone oils and fluorine oils. The poor compatibility component reduces the friction between the ribbon assemblies to prevent damage to the fibers when the cable is bent. The poor compatibility component provides a discontinuous layer on the common coating, in the form of "seas" and "islands". There is no disclosure or teachings relating to mid-span access to the individual coated optical glass fibers contained within the ribbon assemblies.

U.S. Pat. No. 5,561,730 discloses a cable containing a plurality of ribbon units. The common coating material that bind the ribbon assemblies together contains a release agent. Examples of such release agents includes silicone oils and fluorine oils. The release agent reduces the friction between the ribbon assemblies to prevent damage to the fibers when the cable is bent. There is no disclosure or teachings relating to providing mid-span access to the individual coated optical glass fibers contained within the ribbon assemblies.

U.S. Pat. No. 5,621,838 discloses a coated optical glass fiber unit made of a plurality of coated optical glass fibers which are bound together by a common bundling layer. The ink coating on the optical glass fibers and the common bundling layer are treated to suppress bonding there between so that the bundling layer can be removed from the ink layer. A silicone releasing agent or a fluorine releasing agent are added to the ink coating and the common bundling layer.

Silicone and fluorine based release agents can cause undesirable degradation of the inner primary and outer primary coatings over time. When they are not bound to the coating, they can leech out of the coating. They are often time incompatible with the desired coating composition. Thus, conventional silicone and fluorine release agents can only be used in small quantities, such as less than 5% by weight. If the conventional release agents are used in amounts greater than 5% they can cause the matrix material and ink coating to swell and they can collect between the matrix and the ink coating layer causing unavoidable peeling of the matrix from the optical glass fibers, thereby diminishing the protective function of the matrix material.

Use of acrylated silicone and fluorine based release agents in optical glass fiber coatings is also undesirable. For examples, these types of release agents are often incompatible with the components in the ink coating. Use of these types of release agents can also cause undesirable changes in the properties of the ink coating.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable ink composition, for a given radiation source and intensity.

If the line speed is increased to the extent that cure rate time requirements of the radiation-curable ink composition are not provided, the radiation-curable ink composition will not have received a sufficient amount of radiation to cause complete cure, or cross-linking, of the radiation-curable ink composition. The production linear line speed is generally inversely related to the amount of radiation striking the optical glass fiber. That is, as the production line speed is increased the amount of radiation exposure to the radiation-curable ink composition during the production process will necessarily decrease for a given radiation source. Incomplete cure of the radiation-curable ink composition is undesirable and must be avoided because then the desired properties of the incompletely cured ink coating may not be achieved and/or the incompletely cured ink coating may retain tackiness (giving problems in subsequent handling) or a malodorous odor may be present, and there may also be an increase in the extractables (undesirable) in the supposedly-cured ink coating and a lack of adhesion to the coated optical glass fiber.

While the ink composition must have a very fast cure speed to ensure complete cure of the ink coating on the high speed drawing tower, the increase in cure speed should not come at the expense of other important properties of the ink coating, such as providing suitable mid-span access when used in ribbon assemblies. Therefore, there is a need for a radiation-curable ink composition that exhibits adaptable adhesion properties to provide an adhesion between the outer primary coating and the ink coating that is greater than the adhesion between the ink coating and the matrix material to provide mid-span access.

In addition, ink compositions should not contain ingredients that can migrate to the surface of the optical glass fiber and cause corrosion. The ink composition should also not contain ingredients which can cause instability in the protective coatings. Ink coatings for optical glass fibers should be color fast for decades, not cause attenuation of the signal transmission, be impervious to cabling gels and chemicals, and allow sufficient light penetration for fiber core alignment.

From the above, it is clear that optical glass fiber technology places many unique demands on radiation-curable ink compositions which more conventional technologies, such as printing inks, do not. There is a need for radiation-curable ink compositions that provide mid-span access and which avoid the problems associated with conventional fluorine and silicone based release agents.

Usually ink compositions must be cured in an inert atmosphere, i.e. in the absence of oxygen. Providing inert atmospheres on optical glass fiber drawing towers is expensive. Thus, a radiation-curable ink composition which exhibits a high cure speed in the presence of oxygen would provide significant advantages over ink-compositions that must be cured in an inert atmosphere.

SUMMARY OF THE INVENTION

An objective of the present invention is to provide ribbon assemblies which exhibit the functional capability of providing mid-span access to the individually coated optical glass fibers.

Another objective is to provide radiation-curable compositions, such as ink coating compositions, colored outer primary coating compositions, and matrix forming compositions, which when suitably cured provide the combination of properties of (1) exhibiting sufficient adhesion to avoid delamination of the radiation-cured coating from a substrate during normal handling and (2) releasability such that either the radiation-cured coating is capable of releasing from the substrate as a coherent layer or the radiation-cured coating is capable of allowing the substrate to release as a coherent layer.

The above objectives and other objectives can surprisingly be obtained by incorporating a phospholipid into the radiation-curable compositions.

DETAILED DESCRIPTION OF PREFERRED EMBODIMENTS

Radiation-curable compositions are now well known. The improved radiation-curable composition of this invention can be based on any known radiation-curable composition. The known radiation-curable compositions will only become the improved radiation-curable compositions according to the present invention by the incorporation of a phospholipid into the radiation-curable compositions. The improved radiation-curable compositions can also be formulated by combining a phospholipid with at least one radiation-curable monomer or oligomer.

The present invention will now be described in reference to a radiation-curable ink composition. However, it will be understood by one skilled in the art that the present invention is suitable for use in other applications, such as matrix materials and colored outer primary coatings. In general, the present invention is suitable for use whenever separation of the radiation-cured coating from a substrate, or separation of the substrate from the radiation-cured coating, as a coherent layer is desired in combination with providing sufficient adhesion to avoid delamination of the radiation-cured coating from the substrate during normal handling. Examples of suitable substrates are any article normally coated with a radiation-cured coatings, such as optical glass fibers and delicate electronic devices which are coated with a protective radiation-cured coating for shipping and handling.

Radiation-curable ink coating compositions for coating and identifying coated optical glass fibers are now well known. In general, the radiation-curable ink compositions contain at least one pigment dispersed within a radiation-curable carrier system. The conventional ink composition can become the improved ink composition according to the present when a phospholipid is incorporated therein. Alternatively, the improved ink composition according to the present invention can be formulated by combining a phospholipid with a suitable radiation-curable carrier system and at least one pigment.

Any phospholipid can be used in the present invention. In general, phospholipids include lipid compounds that yield on hydrolysis phosphoric acid, an alcohol, a fatty acid, and a nitrogenous base. Specific examples of suitable phospholipids include lecithins, sphingomyelins, and cephalins. Preferably, the phospholipid is a lecithin. Specific examples of suitable lecithins include soya lecithin, acetylated lecithin, and hydroxylated lecithin. Commercially available examples of suitable lecithins include Performix E, the Thermolac series, such as WFC and 57, R & R 552, the Yelkin series, such as 1018, TS and DS, and the Leciwet series (ADM).

Preferably, the phospholipid has an HLB value of at least about 6, more preferably from about 7 to about 30, and most preferably from about 7 to about 20. The HLB value is the well known hydrophilic-lipophilic balance. An HLB value below 6 is normally hydrophobic while HLB values of 8–30 represent a hydrophilic nature.

Phospholipids containing at least one functional group that is capable of binding to the polymeric matrix formed by curing the radiation-curable coating composition are particularly preferred. An example of such a group is the amine group normally present in soya lecithin. It is believed that when the soya lecithin is combined with acrylated oligomers and/or monomers the amine group present on the soya lecithin becomes acrylated via a Michael addition reaction. Other suitable functional groups are any of the radiation-curable functional groups described herein, such as ethylenically unsaturated groups. One skilled in the art of synthesizing organic compounds will easily be able to provide a phospholipid having the desired functional group.

Without being bound by any theory, it is believed that by using a phospholipid having a functional group that is capable of binding to the polymeric matrix, a phospholipid release layer can be formed which is bound on the surface of the radiation-cured coating. Such a phospholipid release coating can be observed by the naked eye and usually feels greasy to the touch. By having the phospholipid release layer bound to the surface of an ink coating, the release layer can be resistant to adsorption into the liquid matrix forming composition when applied to the ink coating. If the release layer is adsorbed into the liquid matrix forming composition, the release layer may not be able to provide the property of releasability. The release layer adjusts the adhesion between the matrix material and the ink coating to a level lower than the adhesion between the ink coating and the outer primary coating, while providing sufficient adhesion between the matrix material and the ink coating to avoid unwanted delamination during normal handling of the ribbon assembly. In this manner, the matrix material can separate from the ink coating as a coherent layer during mid-span access, leaving the ink coating intact on the outer primary coating.

It is believed that during radiation-curing, the phospholipid may migrate to the surface of the formed coating to provide the phospholipid release layer described above. The present invention includes other mechanisms for providing the property of releasability to the coating and is not limited by this migration theory or the release layer mechanism described above.

Preferably, the phospholipid and radiation-curable monomers and oligomers are selected to be compatible such that the phospholipid remains dissolved or dispersed in the liquid radiation-curable carrier system to avoid flocculation. The compatibility of the monomers and oligomers with the phospholipid can be easily determined. For example, the phospholipid can be separately mixed with selected monomers and oligomers. If a hazy mixture is observed, then the monomer or oligomer may be incompatible with the phospholipid. By using monomers and oligomers which form a clear mixture with the desired phospholipid, a radiation-curable composition can be formulated which is resistant to flocculation. An incompatible mixture of monomers, oligomers and phospholipid can also be used if desired. However, the radiation-curable composition may have to be agitated to disperse the phospholipid within the radiation-curable carrier system prior to application.

Phospholipids can be used in a significantly broader range of amounts than conventional silicone and fluorine containing release agents. In particular, it has been found that surprisingly phospholipids can be used in amounts from about 0.1 to about 60 wt. %, preferably about 5 to about 50 wt. %, more preferably about 10 to about 40 wt. %, based on the total weight of the radiation-curable ink coating composition.

Commercial examples of suitable ink compositions that can be reformulated to contain a phospholipid according to the present invention include the UV curable inks available from DSM Desotech Inc., which are based on multi-functional acrylate monomers.

Ink coatings are usually about 3 to about 10 microns thick, and should be concentric to prevent attenuation of the signal transmission. The ink coating also generally has a Tg of at least about 30° C., more preferably at least about 50° C. One of ordinary skill in the art of formulating radiation-curable ink compositions knows how to adjust the radiation-curable composition to provide the desired properties of the cured coating. Thus, radiation-curable compositions which are usually used for forming outer primary coating compositions can be reformulated and utilized as the radiation-curable carrier system in the ink composition according to the present invention. Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Radiation-curable carrier systems which are suitable for forming the present ink composition contain one or more radiation-curable oligomers or monomers having at least one functional group capable of polymerization when exposed to actinic radiation. Suitable radiation-curable oligomers and monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, -vinyl amide, maleate esters, and fumarate esters. Preferably, the ethylenic unsaturation is provided by a group containing acrylate, methacrylate, or N-vinyl functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, at least about 80 mole %, more preferably, at least about 90 mole % of the radiation-curable functional groups present in the oligomer are acrylate, methacrylate and N-vinyl.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. Examples of suitable carbon-containing backbones include polyethers, polyolefins, polyesters, polyamides, and polycarbonates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring-opened epoxy groups or alkoxy groups. The oligomer can be represented by, for example:

R-Ar-R; or

R-L-Ar-L-R where R is a radiation-curable functional group,
Ar is an aromatic group containing moiety, and
L is a linking group.

Examples of suitable linking groups include alkoxy or ring opened epoxy such as ethoxy, propoxy, butoxy, and repeat units thereof. L can also be a urethane or urea linking group.

The aromatic groups can be, for example, derived from bisphenol units, such as bisphenol A. A preferred oligomer is a diglycidyl ether derivative of bisphenol A to which acrylate functional groups have been bound. Another example of a preferred oligomer is a trifunctional polyether or polyester having a molecular weight of about 500 to about 5000.

The radiation-curable carrier systems may also contain a reactive diluent which is used to adjust the viscosity. The reactive diluent can be a low viscosity monomer containing having at least one functional group capable of polymerization when exposed to actinic radiation. Usually, the viscosity of the low viscosity diluent monomer is from about 50 to about 500 centipoise at 25° C. Examples of suitable viscosities for optical glass fiber coating compositions range from about 500 to about 50,000 centipoise at 25° C. This functional group may be of the same nature as that used in the radiation-curable monomer or oligomer. Preferably, the functional group present in the reactive diluent is capable of copolymerizing with the radiation curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decylacrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include: ethyleneglycolphenylether-acrylate, polyethyleneglycolphenyletheracrylate, polypropyleneglycolphenyletheracrylate, and alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:
$C_2$–$C_{18}$ hydrocarbon-dioldiacrylates,
$C_4$–$C_8$ hydrocarbondivinylethers,
$C_3$–$C_{18}$ hydrocarbon triacrylates, and the polyether analogues thereof, and the like,
such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:
epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A, and the like.

If the radiation-curable functional group of the radiation-curable monomer or oligomer has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate.

For amine-ene systems, amine functional diluents that can be used include, for example:
  the adduct of trimethylolpropane, isophoronediisocyanate and di(m)ethylethanolamine,
  the adduct of hexanediol, isophoronediisocyanate and dipropylethanolamine, and
  the adduct of trimethylol propane, trimethylhexamethylenediisocyanate and di(m)ethylethanolamine.

The radiation-curable composition can contain free-radical generating photoinitiators. Examples of suitable free radical-type photoinitiators include, but are not limited to, the following:
isobutyl benzoin ether;
2,4,6 trimethylbenzoyl diphenylphosphine-oxide;
1-hydroxycyclohexylphenyl ketone;
2-benzyl-2-dimethylamino-1-(4-morpholinophenyl)-butan-1-one;
2,2-dimethoxy-2-phenylacetophenone;
perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hydroxyethoxy)phenyl-2-hydroxy-2-propyl ketone dimethoxyphenylacetophenone;
1-(4-isopropylphenyl)-2-hydroxy-2-methylpropan-1-one;
1-(4-dodecyl-phenyl)-2-hydroxy-2-methylpropan-1-one;
4-(2-hyd roxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl) 2-(4-morpholinyl);
and mixtures of these.

Other additives which can be used in the radiation-curable carrier system include, but are not limited to, catalysts, lubricants, wetting agents, antioxidants and stabilizers. The selection and use of such additives is within the skill of the art.

Coated optical fibers are often used in ribbon assemblies. Because of the versatility of the presently invented radiation-curable coating composition, this composition is very well suited for use on coated optical glass fibers in ribbon assemblies. The ink coatings made according to the present invention are surprisingly capable of providing mid-span access without the use of conventional release agents. While not preferred, conventional release agents may nevertheless be used if desired. Suitable conventional release agents include silicones, silicone acrylates, fluorocarbon oils or resins and the like. Because the ink coatings according to the present invention provide mid-span access, conventional release agents can be added in significantly reduced amounts compared to conventional ink coatings. For example, conventional release agent can be present in an amount of about 0.1 to about 5 wt. % based on the total weight of the ink composition.

Any inorganic and organic pigment that is suitable for making radiation-curable ink compositions can be used in the present invention. The use of the term "pigment" refers to both inorganic and organic pigments. Preferably, the pigment is utilized in the form of a pigment dispersion in order to simplify dispersion of the pigment within the ink coating composition. The pigment dispersion usually comprises one or more pigments dispersed in a low viscosity liquid, such as a reactive diluent, in such an amount that the pigment dispersion is easily pourable under ambient temperatures. For example, amounts of about 1 to about 80% by weight pigment dispersed in a reactive diluent have been found to be suitable. Pigment dispersions are well known and therefore one skilled in the art will be able to utilize well known pigment dispersions to formulate improved ink compositions according to the present invention based on the disclosure provided herein.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet, and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors. One skilled in the art is able to form any color as desired by combining different.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 weight %, preferably about 1 to about 15 weight %, more preferably about 1 to about 10 weight %, based on the total weight of the ink composition.

Based on the above, a suitable radiation-curable ink composition can be formulated from a composition containing:

from about 1 to about 20 weight % of at least one pigment;

from about 0.1 weight 60% of at least one phospholipid; and from about 20 to about 99% of a radiation-curable carrier system containing at least one radiation-curable monomer or oligomer, based on the total weight of the ink composition.

A preferred ink composition can be formulated from a composition containing:

from about 1 to about 20 weight % of at least one pigment;

from about 1 to about 80 weight % of at least one radiation-curable oligomer, from about 1 to about 80 weight % of at least one radiation-curable diluent monomer; and from about 0.1 to about 60 weight % of at least one phospholipid, based on the total weight % of the ink composition.

Preferred amounts of the radiation-curable oligomer include from about 10 to about 70% by weight, more preferably, about 20 to about 60% by weight, based on the total weight of the ink composition.

Preferred amounts of the radiation-curable diluent monomer include from about 10 to about 70% by weight, more preferably, about 20 to about 60% by weight, based on the total weight of the ink composition.

Preferably, the ink composition contains a photoinitiator (s) in an amount of about 1 to about 20% by weight, more preferably about 1 to about 10% by weight, based on the total weight of the ink composition.

The ink coating compositions according to the present invention can be formulated to cure in air by exposure to a radiation dose of about 1 Joule/cm$^2$ or less, preferably about 0.8 Joule/cm$^2$ or less, when applied at a coating thickness of from about 5 to about 10 microns. Ink coatings are usually about 3 to about 10 microns thick and are usually concentric to prevent attenuation of the signal transmission. However, if desired, the ink coating can be applied in any form suitable to provide visible color identification of the individual coated optical glass fibers. Examples of suitable coatings include dashes, dots, lines, and rings. Preferably, the ink coating is substantially concentric. The ink coating compositions according to the present invention are capable of providing substantially concentric ink coatings, as well as discontinuous coatings such as dashes, dots, lines, and rings. When less than a concentric coating is applied, the phospholipid can be utilized to provide separation of the matrix material from the dotted, dashed, or otherwise applied ink coating.

The ink coating composition can be applied to the coated optical glass and cured using any suitable method. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

For applications where a colored outer primary coating is utilized in place of or in combination with an ink coating, such as when less than a concentric ink coating is applied, the phospholipid can be incorporated into the colored outer primary coating to provide the desired level of adhesion between the colored outer primary coating and a matrix material. Based on the disclosure provided herein, one skilled in the art will be able to formulate the desired colored outer primary coating utilizing the phospholipid. For example, since the radiation-curable base of outer primary coatings is similar to the radiation-curable carrier systems of ink coatings the phospholipid can be incorporated into colored outer primary coating compositions using the amounts described herein in reference to the ink coating compositions. Thus, the adhesion properties of the colored outer primary coatings can be adjusted in the same manner as the ink coatings described herein by utilizing the phospholipid. Conventional colored outer primary coatings can become the improved colored outer primary coatings according to this invention by incorporating the phospholipid therein. Examples of suitable colored outer primary coatings are disclosed in published PCT application WO 90/13579, the complete disclosure of which is incorporated herein by reference. Alternatively, conventional outer primary coatings can become the improved colored outer primary coating according to the present invention by incorporating therein at least one pigment and a phospholipid.

The phospholipid can be incorporated into a radiation-curable matrix forming composition to provide the property of mid-span access, in a similar manner to the ink coating composition. Radiation-curable matrix forming compositions are based on radiation-curable monomers and oligomers which are similar to those used in the ink coating compositions described above. Thus, the proportions of the phospholipid for formulating ink coating compositions described above can be used for formulating improved matrix forming compositions according to the present invention. Based on the disclosure provided herein, one skilled in the art will easily be able to form improved radiation-curable matrix forming compositions which are capable of providing matrix materials that are capable of mid-span access when used in ribbon assemblies.

In particular, the improved matrix material can be composed of any conventional radiation-curable, matrix-forming composition which has been reformulated to include at least one phospholipid. Examples of conventional radiation-curable, matrix forming compositions which can now be modified according to this invention are disclosed in U.S. Pat. No. 4,844,604, which is incorporated herein by reference. If desired, the matrix forming composition can contain one or more pigments to provide a colored matrix material. The amount of the pigment can be similar to those described herein with reference to the ink coating compositions.

An example of a suitable matrix forming composition can be formulated from a composition containing:

from about 0.1 weight 60% of at least one phospholipid; and from about 20 to about 99.9% of a radiation-curable carrier system containing at least one radiation-curable monomer or oligomer, based on the total weight of the matrix forming composition.

A preferred matrix forming composition can be formulated from a composition containing:

from about 1 to about 80 weight % of at least one radiation-curable oligomer;

from about 1 to about 80 weight % of at least one radiation-curable diluent monomer; and from about 0.1 to about 60 weight % of at least one phospholipid, based on the total weight % of the matrix forming composition.

Preferred amounts of the radiation-curable oligomer include from about 10 to about 70% by weight, more preferably, about 20 to about 60% by weight, based on the total weight of the matrix forming composition.

Preferred amounts of the radiation-curable diluent monomer include from about 10 to about 70% by weight, more preferably, about 20 to about 60% by weight, based on the total weight of the matrix forming composition.

Preferably, the matrix forming composition contains a photoinitiator(s) in an amount of about 1 to about 20% by weight, more preferably about 1 to about 10% by weight, based on the total weight of the matrix forming composition.

The phospholipid can be utilized in either the ink coating or the matrix material, or both, in the ribbon assembly to provide the desired level of mid-span access performance.

Ribbon assemblies are now well known in the art and one skilled in the art will easily be able to use the disclosure provided herein to prepare a novel ribbon assembly containing at least one of the improved ink coated optical glass fibers for the desired applications. The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried under ground or water for long distance connections, such as between cities. The ribbon assembly can also be used to connect directly to residential homes.

The invention will be further explained by way of the following examples, without being limited thereto.

EXAMPLES 1–11 and COMPARATIVE EXAMPLES A–K

A base radiation-curable ink composition was first formed by combining the components shown in Table 1. Different matrix compositions were formulated using the components shown in Table 2. Different commercially available soya lecithins were combined with the base radiation-curable ink composition to form different radiation-curable ink compositions, as shown in Tables 3 and 4.

The ability of the ink compositions to form ink coatings which exhibit mid-span access when utilized in a ribbon assembly, without using silicone or fluorocarbon release agents, was tested. The tests were conducted on radiation-curable compositions that were only mixed by stirring with a spatula (non-homogenized), and then on radiation-curable ink compositions which were homogenized by stirring at a high speed (about 2000 rpm) for about 10 minutes using a cutting blade.

The results are shown in Tables 3 and 4.

TABLE 1

| Component (wt. % based on total weight of composition | Ink Composition IN-1 |
|---|---|
| Epoxy Acrylate | 23.52 |
| Hexafunctional Aromatic Urethane Acrylate | 13.23 |
| Aliphatic Urethane Triacrylate diluted 15% with Hexanediol Diacrylate | 23.43 |
| Pentaerythritol Tetracrylate | 16.72 |
| Hexandiol Diacrylate | 5.1 |
| Troysol 98C | 0.5 |
| 2,6-di-tert-Butyl-Methyl-Phenol | 0.5 |
| 2-Benzyl-2-Dimethylamino-1-(4-Morpholinophenyl)-Butan-1-one | 1 |
| 2-Methyl-1-(4-(Methylthio)Phenyl)2-(4-Morpholinyl)1-Propanone | 4 |
| Pigment Dispersion | 12 |

TABLE 2

| Component (weight % based on total weight of composition) | Matrix Comp. M1 | Matrix Comp. M2 |
|---|---|---|
| Aromatic Urethane Acrylate Oligomer | 55 | 68.24 |
| Isobornyl Acrylate | 3.9 | 0 |
| Propoxylated Hexanediol Diacrylate | 3.9 | 0 |
| Ethoxylated Bisphenol A Diacrylate | 23 | 11 |
| 1-Hydroxycyclohexyl Phenyl Ketone | 4 | 3 |
| Thiodiethylene bis(3,5-di-tert-butyl-4-hydroxy hydrocinnamate) | 0.3 | 0.3 |
| Epoxidized Soybean Oil Acrylate | 10 | 0 |
| Vinyl Caprolactam | 0 | 10 |
| Phenoxy Ethyl Acrylate | 0 | 6.46 |
| Dimethyl Polysiloxane | 0 | 0.3 |
| Dimethyl Polysiloxane (surfactant) | 0 | 0.7 |

TABLE 3

| Component (weight % based on total weight of composition) | Examp. 1 | Examp. 2 | Examp. 3 | Examp. 4 | Examp. 5 | Examp. 6 | Examp. 7 | Examp. 8 | Examp. 9 | Examp. 10 | Examp. 11 |
|---|---|---|---|---|---|---|---|---|---|---|---|
| Ink Composition IN-1 | 90 | 90 | 90 | 90 | 90 | 89.5 | 91.5 | 89.5 | 95.5 | 91.5 | 89.5 |
| Performix E | 10 | 0 | 0 | 0 | 0 | 0 | 0 | 0 | 6 | 8 | 10 |
| Thermolac WFC | 0 | 10 | 0 | 0 | 0 | 0 | 0 | 0 | 0 | 0 | 0 |
| Thermolac 57 | 0 | 0 | 10 | 0 | 0 | 0 | 0 | 0 | 0 | 0 | 0 |
| R & R 552 | 0 | 0 | 0 | 10 | 0 | 0 | 0 | 0 | 0 | 0 | 0 |

TABLE 3-continued

| Component (weight % based on total weight of composition) | Examp. 1 | Examp. 2 | Examp. 3 | Examp. 4 | Examp. 5 | Examp. 6 | Examp. 7 | Examp. 8 | Examp. 9 | Examp. 10 | Examp. 11 |
|---|---|---|---|---|---|---|---|---|---|---|---|
| Yelkin 1018 | 0 | 0 | 0 | 0 | 10 | 0 | 0 | 0 | 0 | 0 | 0 |
| Yelkin TS | 0 | 0 | 0 | 0 | 0 | 10 | 0 | 0 | 0 | 0 | 0 |
| Yelkin DS | 0 | 0 | 0 | 0 | 0 | 0 | 8 | 10 | 0 | 0 | 0 |
| 2-Methyl-1-(4-(Methylthio)Phenyl)2-(4-Morpholinyl) 1-Propanone | 0 | 0 | 0 | 0 | 0 | 0.4 | 0.4 | 0.4 | 0.4 | 0.4 | 0.4 |
| 2-Benzyl-2-Dimethylamino-1-(4-Morpholinophenyl)-Butan-1-one | 0 | 0 | 0 | 0 | 0 | 0.1 | 0.1 | 0.1 | 0.1 | 0.1 | 0.1 |
| Test Results | | | | | | | | | | | |
| Outer Primary Coating | P1 | P1 | P1 | P1 | P1 | P1 | P1 | P1 | P1 | P1 | P1 |
| Matrix Material | M2 | M2 | M2 | M2 | M2 | M1 | M1 | M1 | M1 | M1 | M1 |
| Mid-Span Access (Homogenized) | Pass | Pass | Pass | Pass | Pass | Pass | Pass | Pass | Pass | Pass | Pass |
| Mid-Span Access (Non-Homogenized) | Pass | Pass | Pass | Fail | Fail | Fail | Fail | Fail | Fail | Fail | Fail |

P1 = commercially available radiation-curable, outer primary coating composition.

TABLE 4

| Component (weight % based on total weight of composition) | Comp. Examp. A | Comp. Examp. B | Comp. Examp. C | Comp. Examp. D | Comp. Examp. E | Comp. Examp. G | Comp. Examp. H | Comp. Examp. I | Comp. Examp. J | Comp. Examp. K |
|---|---|---|---|---|---|---|---|---|---|---|
| Ink Composition IN-1 | 90 | 97.5 | 95.5 | 93.5 | 91.5 | 97.5 | 95.5 | 93.5 | 97.5 | 95.5 |
| Performix E | 0 | 0 | 0 | 0 | 0 | 0 | 0 | 0 | 2 | 4 |
| Beakin LV3 | 10 | 0 | 0 | 0 | 0 | 0 | 0 | 0 | 0 | 0 |
| Yelkin TS | 0 | 2 | 4 | 6 | 8 | 0 | 0 | 0 | 0 | 0 |
| Yelkin DS | 0 | 0 | 0 | 0 | 0 | 2 | 4 | 6 | 0 | 0 |
| 2-Methyl-1-(4-(Methylthio)Phenyl)2-(4-Morpholinyl) 1-Propanone | 0 | 0.4 | 0.4 | 0.4 | 0.4 | 0.4 | 0.4 | 0.4 | 0.4 | 0.4 |
| 2-Benzyl-2-Dimethylamino-1-(4-Morpholinophenyl)-Butan-1-one | 0 | 0.1 | 0.1 | 0.1 | 0.4 | 0.1 | 0.1 | 0.1 | 0.1 | 0.1 |
| Test Results | | | | | | | | | | |
| Outer Primary Coating | P1 | P1 | P1 | P1 | P1 | P1 | P1 | P1 | P1 | P1 |
| Matrix Material | M2 | M1 | M1 | M1 | M1 | M1 | M1 | M1 | M1 | M1 |
| Mid-Span Access (Homogenized) | Fail | Fail | Fail | Fail | Fail | Fail | Fail | Fail | Fail | Fail |
| Mid-Span Access (Non-Homogenized) | Fail | Fail | Fail | Fail | Fail | Fail | Fail | Fail | Fail | Fail |

Performix E, Thermolac WFC, Thermolac 57, R&R 552, Yelkin 1018, Yelkin TS, Yelkin DS, and Beakin LV3 (ADM) are commercially available soya lecithins.
P1 = Commercially Available The results in Tables 3 and 4 demonstrate that surprisingly soya lecithin is an effective agent for providing the cured ink coating with the ability to break-out from a matrix material, without the use of silicone or fluorocarbon release agents. The ability to provide mid-span access in a ribbon assembly without the use of silicone or fluorocarbon release agents provides an significant advantage. The longevity of the ribbon assembly can be greatly increased because the deleterious effects of silicone and fluorocarbons over time are avoided.

It is believed that the Beakin LV3 was unable to provide an ink coating having break-out properties because of the lower HLB value of Beakin LV3 compared to the other lecithins used in the Examples. The HLB and Gardner colors for the different lecithins utilized are shown in Table 5. It is also believed that Beakin LV3 may work when used in conjunction with different radiation-curable monomers and oligomers.

TABLE 5

| Component | HLB | Maximum Gardner Color |
|---|---|---|
| Performix E | 12 | 14 |
| Thermolac WFC | 11 | 13 |
| Thermolac 57 | 7 | 14 |
| Yelkin 1018 | 9 | 12 |
| R&R 552 | 12 | 13 |
| Yelkin DS | 4 | 12 |
| Yelkin TS | 4 | 17 |
| Beakin LV3 | 2 | 13 |

EXAMPLE 12 and COMPARATIVE EXAMPLES L–S

Soy lecithin was compared to conventional release agents as follows. The ink compositions shown in Table 6 were formed and tested in the same manner as Example 1. The test results are shown in Table 6.

TABLE 6

| Component (weight % based on total weight of composition) | Examp. 12 | Comp. Examp. L | Comp. Examp. M | Comp. Examp. N | Comp. Examp. O | Comp. Examp. P | Comp. Examp. Q | Comp. Examp. R | Comp. Examp. S |
|---|---|---|---|---|---|---|---|---|---|
| Ink Composition IN-1 | 90 | 90 | 90 | 90 | 90 | 90 | 90 | 90 | 90 |
| Epoxidized Soybean Oil | 0 | 10 | 0 | 0 | 0 | 0 | 0 | 0 | 0 |
| Carbowax PEG 200 | 0 | 0 | 10 | 0 | 0 | 0 | 0 | 0 | 0 |
| Carbowax PEG 300 | 0 | 0 | 0 | 10 | 0 | 0 | 0 | 0 | 0 |
| Carbowax PEG 400 | 0 | 0 | 0 | 0 | 10 | 0 | 0 | 0 | 0 |
| Carbowax PEG 540 | 0 | 0 | 0 | 0 | 0 | 10 | 0 | 0 | 0 |
| Carbowax PEG 600 | 0 | 0 | 0 | 0 | 0 | 0 | 10 | 0 | 0 |
| Difunctional propylisocyanate trimethoxysilane fluorinated polygylcol | 0 | 0 | 0 | 0 | 0 | 0 | 0 | 10 | 0 |
| Soya Lecithin, R&R 551 | 10 | 0 | 0 | 0 | 0 | 0 | 0 | 0 | 0 |
| Kemester 6000 | 0 | 0 | 0 | 0 | 0 | 0 | 0 | 0 | 10 |
| Test Results | | | | | | | | | |
| Outer Primary Coating | P1 | P1 | P1 | P1 | P1 | P1 | P1 | P1 | P1 |
| Matrix Material | M2 | M2 | M2 | M2 | M2 | M2 | M2 | M2 | M2 |
| Mid-Span Access | Pass | Fail | Fail | Fail | Fail | Fail | Fail | Fail | Fail |

The results in Table 6 demonstrate that the use of a phospholipid according to the present invention surprisingly provides ribbon assemblies which are capable of exhibiting mid-span access when conventional release agents such as fluorinated silicone are incapable of providing mid-span access.

Test Procedures

Mid-Span Access

A 75 micron thick drawdown of a commercially available, radiation-curable outer primary coating composition was applied to a Mylar sheet and cured by exposure to 1 Joule/cm$^2$ of UV light from a Fusion D lamp under a nitrogen atmosphere to form a cured outer primary film. A 5 to 10 micron thick drawdown of the sample radiation-curable ink composition was formed on the cured outer primary film. The ink-composition was cured by exposure to 1 Joule/cm$^2$ of UV light from a Fusion D lamp in air to form a cured ink coating. A 75 micron thick drawdown of a commercially available radiation-curable matrix composition was formed on the ink coating. The matrix composition did not contain any fluorocarbon or silicone release agents. The matrix composition was cured by exposure to 1 Joule/cm$^2$ of UV light from a Fusion D lamp under a nitrogen atmosphere to form a cured matrix material on the ink coating.

Strips of the formed multilayer film were cut having a width of from about ¼ to about ½ inch. At one end of each strip, a portion of the matrix material was separated from the ink coating using a knife. Force was applied to the separated portion of the matrix material to attempt to peel the remaining matrix material from the ink coating. If the remaining matrix material separated cleanly from the ink coating, wherein the ink coating remained intact and the matrix material did not break apart, the ink coating passed the mid-span access test.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A ribbon assembly comprising:
   a plurality of coated optical glass fibers, wherein at least one of said coated optical glass fibers contains an ink coating or colored outer primary coating; and
   a matrix material which binds said plurality of coated optical glass fibers together, wherein at least one of said ink coating, said colored outer primary coating, or said matrix material contains a phospholipid, and wherein said ribbon assembly having the following combination of properties:
   (i) sufficient adhesion between said ink coating or colored outer primary coating and said matrix material to substantially avoid delamination of said matrix material from said ink coating or colored outer primary coating during normal handling; and
   (ii) provide releasability such that said matrix material is capable of releasing from said ink coating or colored outer primary coating as a coherent layer.

2. A ribbon assembly according to claim 1, wherein said phospholipid is selected from the group consisting of lecithins, sphingomyelins, and cephalins.

3. A ribbon assembly according to claim 1, wherein said phospholipid is a lecithin.

4. A ribbon assembly according to claim 1, wherein said phospholipid has an HLB value of at least about 6.

5. A ribbon assembly according to claim 1, wherein said phospholipid is present in an amount of from about 0.1 to about 60 wt. %, based on the total weight of a radiation-curable composition utilized to form said matrix material, said ink coating, or said colored outer primary coating.

6. A ribbon assembly according to claim 1, wherein said phospholipid is present in an amount of from about 5 to about 50 wt. %, based on the total weight of a composition utilized to form said matrix material, said ink coating, or said colored outer primary coating.

7. A ribbon assembly according to claim 1, wherein said phospholipid is present in an amount of from about 10 to about 40 wt. %, based on the total weight of a composition utilized to form said matrix material, said ink coating, or said colored outer primary coating.

8. A ribbon assembly according to claim 1, wherein said ink coating, said colored outer primary coating or said matrix material containing said phospholipid is free of a lubricant.

9. A ribbon assembly according to claim 1, wherein at least one of said matrix material, said ink coating, or said colored outer primary coating being formulated from a radiation-curable composition comprising at least one radiation-curable monomer or oligomer and a phospholipid having at least one functional group which binds to a polymeric matrix formed by curing said at least one radiation-curable monomer or oligomer.

10. A ribbon assembly comprising:
- a plurality of coated optical glass fibers, wherein at least one of said coated optical glass fibers contains an ink coating or colored outer primary coating; and
- a matrix material which binds said plurality of coated optical glass fibers together, wherein said ink coating or said colored outer primary coating contains a phospholipid, and wherein said ribbon assembly having the following combination of properties:
  (i) sufficient adhesion between said ink coating or colored outer primary coating and said matrix material to substantially avoid delamination of said matrix material from said ink coating or colored outer primary coating during normal handling; and
  (ii) provide releasability such that said matrix material is capable of releasing from said ink coating or colored outer primary coating as a coherent layer.

11. A ribbon assembly comprising:
- a plurality of coated optical glass fibers, wherein at least one of said coated optical glass fibers contains an ink coating or colored outer primary coating; and
- a matrix material which binds said plurality of coated optical glass fibers together, wherein said matrix material contains a phospholipid, and wherein said ribbon assembly having the following combination of properties:
  (i) sufficient adhesion between said ink coating or colored outer primary coating and said matrix material to substantially avoid delamination of said matrix material from said ink coating or colored outer primary coating during normal handling; and
  (ii) provide releasability such that said matrix material is capable of releasing from said ink coating or colored outer primary coating as a coherent layer.

* * * * *